(No Model.)

J. R. SHOEMAKER.
ROPING ATTACHMENT FOR TRUNKS, &c.

No. 398,546. Patented Feb. 26, 1889.

WITNESSES:
C. Neveux
C. Sedgwick

INVENTOR:
J. R. Shoemaker
BY Munn & Co
ATTORNEYS.

UNITED STATES PATENT OFFICE.

JOSEPH R. SHOEMAKER, OF DURANGO, COLORADO.

ROPING ATTACHMENT FOR TRUNKS, &c.

SPECIFICATION forming part of Letters Patent No. 398,546, dated February 26, 1889.

Application filed August 14, 1888. Serial No. 282,721. (No model.)

*To all whom it may concern:*

Be it known that I, JOSEPH R. SHOEMAKER, of Durango, in the county of La Plata and State of Colorado, have invented a new and useful Improvement in Roping Attachments or Braces for Trunks and other Like Articles, of which the following is a full, clear, and exact description.

This invention consists in a corner-brace for trunks, valises, and other like articles, capable of ready attachment for use by the general public when traveling, and constructed substantially as hereinafter described, and pointed out in the claims, to provide for roping or strapping the trunk or package after it has been locked and bolted, to relieve the lock or bolt of strain, and whereby the rope is kept in place and prevented from slackening and slipping off projecting portions of the trunk or package, also serving to prevent the binding-rope from being cut by the corners or angular portions of the trunk, as well as adding to the strength of the trunk itself. In its special construction for application or use as described it essentially differs from other outside corner-braces applied in connection with binding-wires to merchandise-boxes and certain corrugated stiffening corner-braces, likewise from certain permanently-fixed bumpers or protectors applied in connection with rubber rings to trunks of a special construction.

Reference is to be had to the accompanying drawings, forming a part of this specification, in which similar letters of reference indicate corresponding parts in all the figures.

Figure 1:
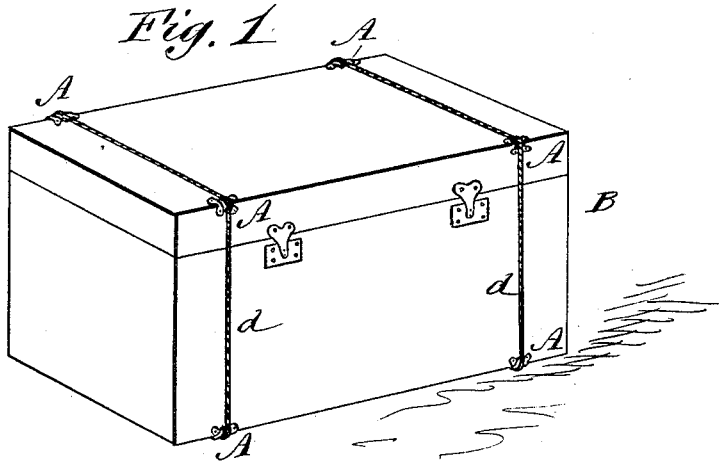
Figure 2:
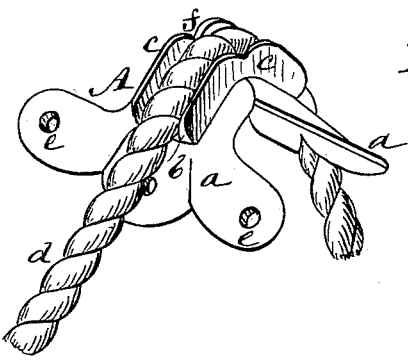
Figure 3:
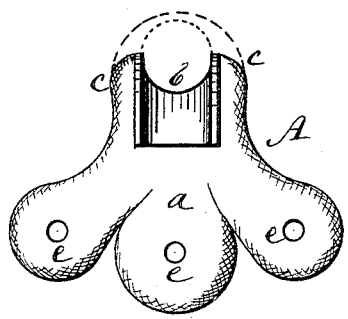

Figure 1 represents a view in perspective of a roped and locked or closed trunk having my invention applied. Fig. 2 is a perspective view of my improved corner-brace and rope-holder detached, with a portion of the binding-rope in place. Fig. 3 is a side view of said brace and holder, and Fig. 4 is an end view of the same.

A A indicate the corner-braces and rope-holders applied, as shown in Fig. 1, to the longitudinal corners or angular portions of the body and lid of a trunk, B. Each of these braces or devices A, which is made of metal or other suitable rigid material, is of plain approximately right-angled construction upon its inner surface, and is formed with or of flange-like sides $a$ $a$, surmounted by or joining a circular grooved portion, $b$, having sides or flanges $c$ $c$ to receive the binding-rope $d$ within them. If desired, this circular grooved portion $b$ $c$ $c$ may be constructed to form a covered groove, as shown by dotted lines in Fig. 3, to receive the binding-rope $d$ through it. Each flange portion $a$ has tack or screw holes $e$ formed in it to provide for the attachment of the brace and rope-holder to the trunk when required.

Applied to a trunk or valise, these combined braces and rope-holders will serve not only to stiffen the trunk or valise, but also to hold the binding-rope in place or from slipping out and from being cut by the corners or angular portions of the trunk, as hereinbefore set forth.

Figure 4:
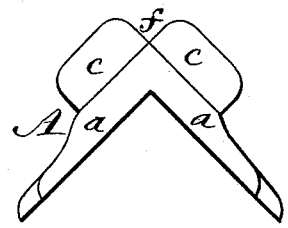

To provide for bending the brace to fit other than strictly right-angled surfaces—as, for instance, when applying it to trunks having rounded lids or tops, over which the rope may be passed lengthwise as well as crosswise—the top of the brace or its sides or flanges $c$ $c$ are notched, as shown at $f$ in Figs. 2 and 4 of the drawings.

Having thus described my invention, what I claim as new, and desire to secure by Letters Patent, is—

1. The within-described combined brace and rope-holder for trunks and other like articles, constructed of side flanges arranged at right angles with each other on their inner surfaces, and terminating where meeting in a projecting open or covered circular grooved portion, substantially as and for the purposes herein set forth.

2. As a new article of manufacture, a combined trunk-brace and rope-holder composed of perforated sides or flanges $a$ $a$, arranged at right angles with each other on their inner surfaces and terminating at their meeting ends in a circular grooved portion, $b$ $c$ $c$, essentially as shown and described.

JOSEPH R. SHOEMAKER.

Witnesses:
HARRY M. WEST,
WILLIAM BAYLY.